(12) United States Patent
Watanabe et al.

(10) Patent No.: US 9,175,779 B2
(45) Date of Patent: Nov. 3, 2015

(54) DIAPHRAGM VALVE

(71) Applicant: FUJIKIN INCORPORATED, Osaka-shi (JP)

(72) Inventors: Kazunari Watanabe, Osaka (JP); Mutsunori Koyomogi, Osaka (JP); Izuru Shikata, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 173 days.

(21) Appl. No.: 13/924,767

(22) Filed: Jun. 24, 2013

(65) Prior Publication Data

US 2014/0001391 A1   Jan. 2, 2014

(30) Foreign Application Priority Data

Jun. 29, 2012 (JP) .................. 2012-147298

(51) Int. Cl.
*F16K 7/12* (2006.01)
*F16K 31/122* (2006.01)
*F16K 7/17* (2006.01)

(52) U.S. Cl.
CPC ... *F16K 7/12* (2013.01); *F16K 7/17* (2013.01); *F16K 31/1226* (2013.01)

(58) Field of Classification Search
CPC .......... F16K 7/12; F16K 7/17; F16K 31/1226
USPC .................. 251/61–61.5, 331, 335.2
See application file for complete search history.

(56) References Cited

U.S. PATENT DOCUMENTS

| | | | | |
|---|---|---|---|---|
| 1,316,585 A | * | 9/1919 | Logan | 251/269 |
| 3,240,128 A | * | 3/1966 | Wilson | 92/96 |
| 4,760,990 A | * | 8/1988 | Kerger et al. | 251/335.2 |
| 4,867,201 A | * | 9/1989 | Carten | 137/625.18 |
| 5,112,027 A | * | 5/1992 | Hanyu et al. | 251/331 |
| 5,215,286 A | * | 6/1993 | Kolenc | 251/58 |
| 5,326,078 A | * | 7/1994 | Kimura | 251/331 |
| 5,335,691 A | * | 8/1994 | Kolenc | 137/312 |
| 5,524,865 A | * | 6/1996 | Uchisawa et al. | 251/331 |
| 5,638,862 A | * | 6/1997 | Miller | 137/557 |
| 5,669,414 A | * | 9/1997 | Miller | 137/557 |
| 5,671,775 A | * | 9/1997 | Miller | 137/557 |
| 5,722,638 A | * | 3/1998 | Miller et al. | 251/335.2 |
| 5,797,428 A | * | 8/1998 | Miller | 137/557 |
| 6,341,758 B1 | * | 1/2002 | Shih et al. | 251/63.4 |
| 2005/0211944 A1 | * | 9/2005 | Tutt et al. | 251/331 |

FOREIGN PATENT DOCUMENTS

EP   0530947 A1   3/1993
JP   5-80858 A    4/1993

* cited by examiner

*Primary Examiner* — Marina Tietjen
(74) *Attorney, Agent, or Firm* — Locke Lord LLP

(57) ABSTRACT

Provided is a diaphragm valve that can improve durability when the diaphragm valve is downsized. In a pressing adaptor, a whole lower surface thereof has a taper shape at a predetermined inclination angle. A bottom surface of a depression of a body has a circular flat portion and a depression that is continued to an outer circumference of the flat portion and is depressed with respect to the flat portion. In a diaphragm, in a state where a fluid inflow channel is opened, an upper surface of an outer circumferential edge portion comes into surface contact with the taper-shaped lower surface of the pressing adaptor, and a lower surface of the outer circumferential edge portion comes into line contact with the outer circumference of the flat portion of the bottom surface of the depression of the body.

10 Claims, 2 Drawing Sheets

DIAPHRAGM VALVE

BACKGROUND OF THE INVENTION

The present invention relates to a diaphragm valve, and particularly to a diaphragm valve that can be downsized.

As a diaphragm valve, there has been known one including a body provided with a fluid channel and a depression opening upward, a seat arranged in a circumferential edge of the fluid channel formed in the body, a spherical shell-shaped diaphragm that opens and closes the fluid channel by being pressed against and separated from the seat, a pressing adaptor that retains an outer circumferential edge portion of the diaphragm between a bottom surface of the depression of the body and itself, a diaphragm presser that presses a central portion of the diaphragm, and up and down movement means for moving up and down the diaphragm presser (Japanese Unexamined Patent Application Publication No. 05-80858 and the like).

In the above-described diaphragm, the outer circumferential edge portion thereof is fixed to the body, so that the depression opening upward provided in the body is sealed, and a central portion thereof can be elastically deformed (can move up and down) with respect to the outer circumferential edge portion. Thus, the diaphragm is elastically deformed with the up-to-down movement of the diaphragm presser to thereby contribute to fluid channel opening and closing.

Conventionally, a lower surface of the pressing adaptor is made up of a tapered portion having a predetermined inclination angle, and a flat portion provided in an outer circumference of a tapered surface, and an outer circumferential edge portion of the bottom surface of the depression of the body is circular and flat, so that the outer circumferential edge portion of the diaphragm is sandwiched between the flat portion of the pressing adaptor and the flat bottom surface of the outer circumferential edge portion of the body.

In the above-described conventional diaphragm valve, since the diaphragm is largely deformed every time opening and closing operations are performed, it is important to increase durability. Particularly, since when the diaphragm valve is downsized, the diaphragm is also downsized, the downsizing is disadvantageously difficult in view of durability assurance. In the conventional diaphragm valve, since the outer circumferential edge portion of the diaphragm is sandwiched between the flat portion of the pressing adaptor and the flat bottom surface of the outer circumferential edge portion of the body, the flat portion that cannot be deformed and is bent with respect to a spherical shell-shaped portion exists in the outer circumferential edge portion of the spherical shell-shaped and elastically deformable diaphragm, which brings a disadvantage in durability.

SUMMARY OF THE INVENTION

An object of the present invention is to provide a diaphragm valve that can improve durability when the diaphragm valve is downsized.

A diaphragm valve according to the present invention includes a body provided with a fluid channel and a depression opening upward, a seat arranged in an circumferential edge of the fluid channel formed in the body, an elastically-deformable, spherical shell-shaped diaphragm that opens and closes the fluid channel by being pressed against and separated from the seat, a pressing adaptor that retains an outer circumferential edge portion of the diaphragm between a bottom surface of the depression of the body and itself, a diaphragm presser that presses a central portion of the diaphragm, and up and down movement means for moving up and down the diaphragm presser. In the pressing adaptor, a whole lower surface thereof has a taper shape at a predetermined inclination angle. The bottom surface of the depression of the body has a circular flat portion, and a depression that is continued to an outer circumference of the flat portion and is depressed with respect to the flat portion. In the diaphragm, in a state where the fluid channel is opened, an upper surface of the outer circumferential edge portion comes into surface contact with the taper-shaped lower surface of the pressing adaptor, and a lower surface of the outer circumferential edge portion comes into line contact with the outer circumference of the flat portion of the bottom surface of the depression of the body.

In the state where the fluid channel is opened (normally, in an upward convex, spherical shell-shaped state), in the diaphragm, the upper surface of the outer circumferential edge portion of the diaphragm is in surface contact with the lower surface of the pressing adaptor, so that deformation from the spherical shell shape in the natural state can be restrained. The lower surface of the outer circumferential edge portion of the diaphragm is in line contact with the outer circumference of the flat portion of the bottom surface of the depression of the body, so that in the diaphragm, a state where the deformation from the spherical shell shape in the natural state is restrained is maintained even in the state where the diaphragm is retained by the pressing adaptor and the body. That is, since a flat section that cannot be deformed and is bent with respect to the spherical shell-shaped section does not exist in the outer circumferential edge portion of the elastically-deformable, spherical shell-shaped diaphragm, local concentration of stress can be avoided, so that the deformation of the diaphragm is optimized, thereby improving durability of the diaphragm.

It is preferable that a taper angle of the lower surface of the pressing adaptor is set with respect to 15.5° to 16.5° to the flat surface of the body.

Setting the taper angle of the lower surface of the pressing adaptor to 15.5° to 16.5° (not less than 15.5° and not more than 16.5°) with respect to the flat surface of the body can further improve the durability, as compared with a diaphragm valve wherein the taper angle of the lower surface of the pressing adaptor is set to 14°, 18° or the like with respect to the flat surface of the body.

It is preferable that a curvature radius of a surface, which comes into contact with the diaphragm, of the diaphragm presser is set to 10.5 mm to 12.5 mm (not less than 10.5 mm and not more than 12.5 mm).

This enables the effect by the shape of the diaphragm presser to be added, so that the durability can be further improved.

The diaphragm valve may be a manual valve in which the up and down movement means is an opening and closing handle or the like, or maybe an automatic valve in which the up and down movement means is an appropriate actuator, and in the case of the automatic valve, fluid (air) pressure may be used or electromagnetic force may be used.

In this specification, while a movement direction of a stem is an up-to-down direction, this direction is merely for convenience, and in actual installation, the up-to-down direction may be defined as not only a vertical direction but also a horizontal direction.

According to the diaphragm valve of the present invention, the deformation of the diaphragm is optimized, and the durability of the diaphragm can be improved.

DETAILED DESCRIPTION OF PREFERRED EMBODIMENTS

Embodiments of the present invention will be described with reference to the drawings. In the following description, "upper and lower" as well as "right and left" denote "upper and lower" as well as "right and left" in FIG. 1.

Figure 1:
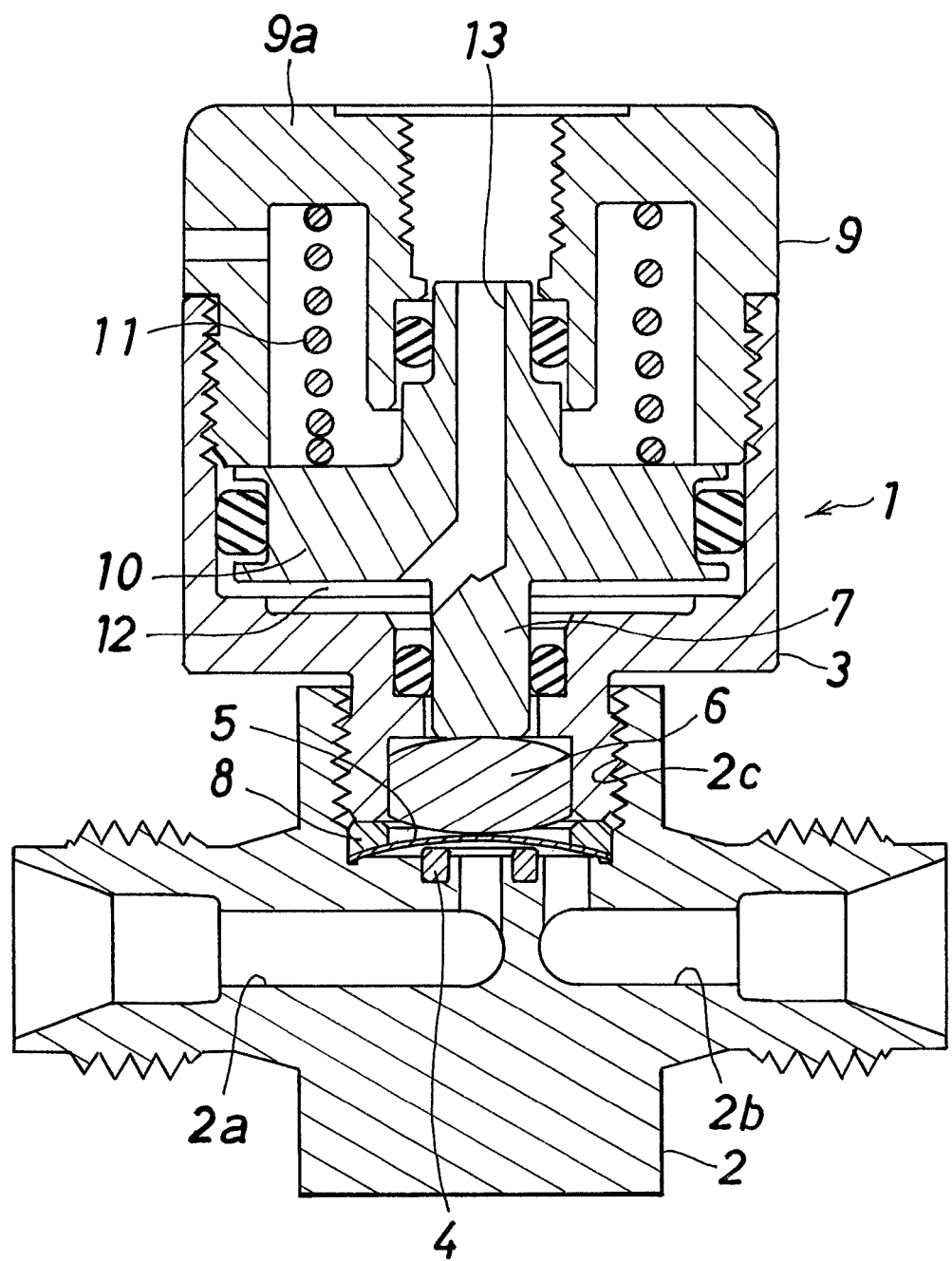
FIG. 1 is a longitudinal section view showing one embodiment of a diaphragm valve according to the present invention, which shows a state where a fluid channel is opened.

FIG. 1 shows one embodiment of a diaphragm valve according to the present invention, and a diaphragm valve 1 includes a block-like body 2 having a fluid inflow channel 2a, a fluid outflow channel 2b, and a depression 2c opening upward, a cylindrical hood 3 a lower end portion of which is screwed into an upper portion of the depression 2c of the body 2 to extend upward, an annular seat 4 provided in a circumferential edge of the fluid inflow channel 2a, a diaphragm 5 that is pressed against or separated from the seat 4 to open and close the fluid inflow channel 2a, a diaphragm presser 6 that presses a central portion of the diaphragm 5, a stem 7 that is inserted into the hood 3 movably in an up-to-down direction to press and separate the diaphragm 5 against and from the seat 4 through the diaphragm presser 6, a pressing adaptor 8 that is arranged between a lower end surface of the hood 3 and a bottom surface of the depression 2c of the body 2 to retain an outer circumferential edge portion of the diaphragm 5 between the bottom surface of the depression 2c of the body 2 and itself, a casing 9 that has a top wall 9a and is screwed into the hood 3, a piston 10 integrated with the stem 7, a compression coil spring (biasing member) 11 that biases the piston 10 downward, an operation-air introduction chamber 12 provided in a lower surface of the piston 10, and an operation-air introduction channel 13 that introduces operation air into the operation-air introduction chamber 12.

Figure 2:
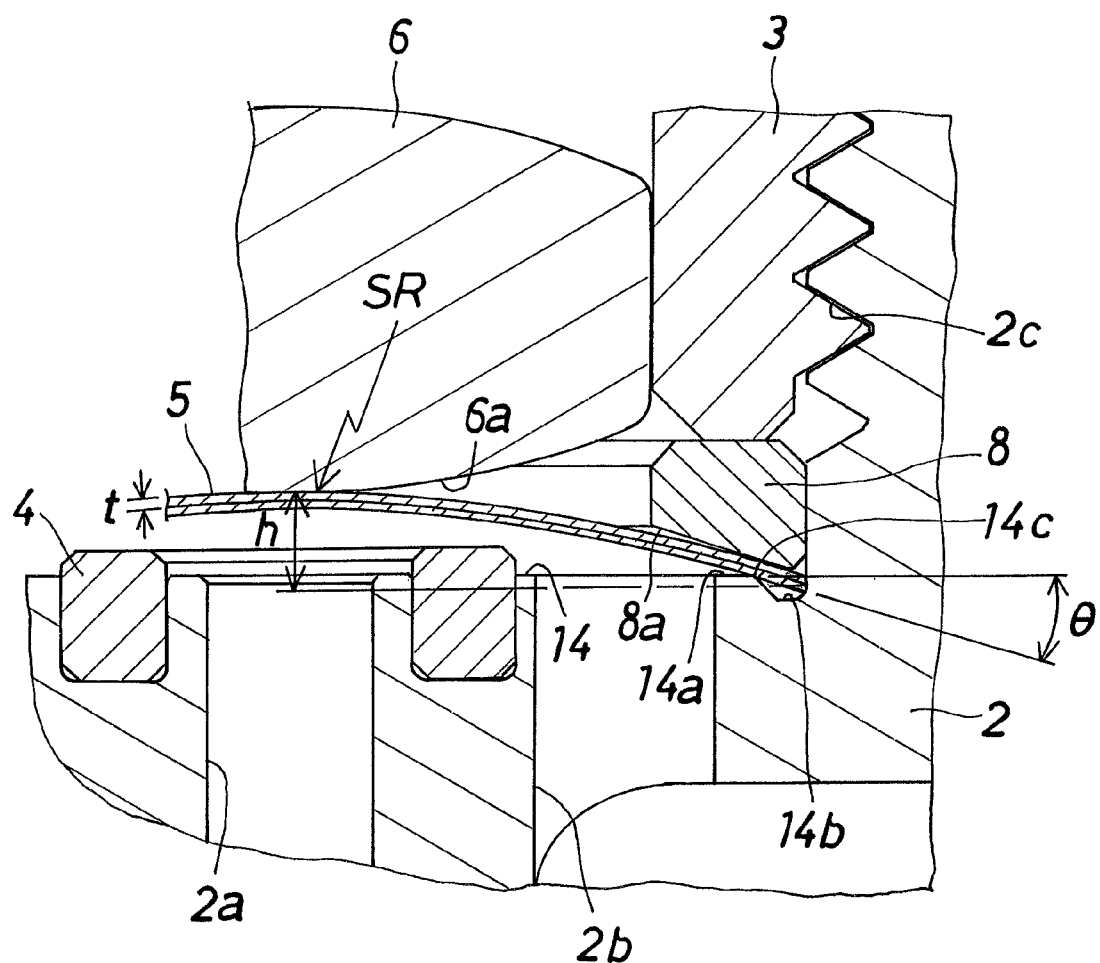
FIG. 2 is an enlarged longitudinal section view showing a substantial part of FIG. 1 in an enlarged manner.

The diaphragm 5 is spherical shell-shaped, and is shaped into an upward convex arc shown in FIGS. 1 and 2 in a natural state. The diaphragm 5 is made of, for example, a nickel alloy thin sheet, which is cut out into a circle to be formed into the spherical shell shape with the central portion swelling upward. The diaphragm 5 may be made of a stainless steel thin sheet, or made of a laminated body of a stainless steel thin sheet and a nickel and cobalt alloy thin sheet.

As shown in FIG. 2 in an enlarged manner, in the pressing adaptor 8, a whole lower surface 8a thereof has a taper shape at a predetermined inclination angle. Moreover, a bottom surface 14 of the depression 2c of the body 2 has a circular flat portion 14a and an annular depression 14b that is continued to an outer circumference of the flat portion 14a and is depressed with respect to the flat portion 14a.

Screwing the hood 3 into the body 2 allows the pressing adaptor 8 to be fixed in contact with the outer circumferential edge portion of the diaphragm 5 from an upper surface thereof. At this time, since the whole lower surface 8a of the pressing adaptor 8 has the taper shape, the diaphragm 5 is hardly deformed from the spherical shell shape (the upward convex arc shape) and is retained between the pressing adaptor 8 and the bottom surface 14 of the depression 2c of the body 2 in a state where an upper surface of the outer circumferential edge portion thereof comes into surface contact (wide-range contact) with the taper-shaped lower surface 8a of the pressing adaptor 8. Moreover, since the depression 14b is provided in an outer circumferential edge portion of the bottom surface 14 of the depression 2c of the body 2, the outer circumferential edge portion of the diaphragm 5 is contained inside the depression 14b. Accordingly, the outer circumferential edge portion of the diaphragm 5 is not subject to the deformation along the bottom surface 14 of the depression 2c of the body 2, but a lower surface thereof comes into line contact with an outer circumference 14c of the flat portion 14a of the bottom surface 14 of the depression 2c.

As a specific numerical value of one of the respective members, a taper angle $\theta$ of the lower surface 8a of the pressing adaptor 8 is 16° (15.5° to 16.5°) to the flat portion 14a of the bottom surface 14 of the depression 2c of the body 2. Moreover, a curvature radius SR of a surface 6a, which comes into contact with the diaphragm 5, of the diaphragm presser 6 is 11 mm or 12 mm (10.5 mm to 12.5 mm).

Table 1 shows durability test results of the diaphragm 5 in a case where the shape SR of the diaphragm presser 6 and the taper angle $\theta$ of the pressing adaptor 8 are varied. The diaphragm 5 is obtained by laminating two diaphragms each having a thickness t of 0.05 mm, and a height h of the diaphragm 5 (height from an outer circumferential edge to a top of the diaphragm 5) is 0.7 mm.

TABLE 1

| No. | Diaphragm presser shape SR (mm) | Pressing adaptor angle $\theta$ (°) | Durable number of times of diaphragm (ten thousands) |
| --- | --- | --- | --- |
| 1 | 7 | 18 | 12 |
| 2 | 8 | 18 | 20 |
| 3 | 8 | 18 | 18 |
| 4 | 10 | 16 | 20 |
| 5 | 11 | 16 | 30 |
| 6 | 12 | 16 | 30 |
| 7 | 10 | 16 | 25 |
| 8 | 11 | 16 | 30 |
| 9 | 12 | 16 | 35 |

It is apparent from Table 1 that setting the taper angle $\theta$ of the lower surface 8a of the pressing adaptor 8 to 16° (15.5° to 16.5°), and the curvature radius SR of the diaphragm presser 6 to 11 mm or 12 mm (10.5 mm to 12.5 mm) can improve the durability.

That is, since in the diaphragm 5, a deformation amount from the natural state varies, depending on the taper angle $\theta$ of the lower surface 8a of the pressing adaptor 8, the taper angle $\theta$ affects the durability of the diaphragm 5. Accordingly, optimizing the taper angle $\theta$, specifically, setting the taper angle $\theta$ to 15.5° to 16.5° can improve the durability of the diaphragm 5. Also, the deformation amount of the diaphragm 5 from the natural state varies, depending on the curvature radius SR of the diaphragm presser 6. Consequently, optimizing the curvature radius SR, specifically, setting the curvature radius SR to 10.5 mm to 12.5 mm can further improve the durability of the diaphragm 5.

While in the foregoing, the stem 7, the piston 10, the compression coil spring (biasing member) 11, the operation-air introduction chamber 12, the operation-air introduction channel 13 and the like form up and down movement means for moving up and down the diaphragm presser 6, the configuration of the up and down movement means is not limited to one shown in FIG. 1.

What is claimed is:
1. A diaphragm valve comprising:
a body provided with a fluid channel and a depression opening upward;

a seat arranged in a circumferential edge of the fluid channel formed in the body;
an elastically-deformable, spherical shell-shaped diaphragm that opens and closes the fluid channel by being pressed against and separated from the seat;
a pressing adaptor that retains an outer circumferential edge portion of the diaphragm between a bottom surface of the depression of the body and itself;
a diaphragm presser that moves up and down and presses a central portion of the diaphragm, wherein
in the pressing adaptor, a whole lower surface thereof has a taper shape at a predetermined inclination angle,
the bottom surface of the depression of the body has a circular flat portion, and a depression that is continued to an outer circumference of the flat portion and is depressed with respect to the flat portion, and
in the diaphragm, in a state where the fluid channel is opened, an upper surface of the outer circumferential edge portion comes into surface contact with the taper-shaped lower surface of the pressing adaptor, and a lower surface of the outer circumferential edge portion comes into line contact with the outer circumference of the flat portion of the bottom surface of the depression of the body.

2. The diaphragm valve according to claim 1, wherein a taper angle of the lower surface of the pressing adaptor is set to 15.5° to 16.5° with respect to the flat portion of the bottom surface of the depression of the body.

3. The diaphragm valve according to claim 1, wherein a curvature radius of a surface, which comes into contact with the diaphragm, of the diaphragm presser is set to 10.5 mm to 12.5 mm.

4. The diaphragm valve according to claim 2, wherein a curvature radius of a surface, which comes into contact with the diaphragm, of the diaphragm presser is set to 10.5 mm to 12.5 mm.

5. The diaphragm valve according to claim 1, wherein the outer circumferential edge portion of the diaphragm is contained inside the depression.

6. A diaphragm valve comprising:
a body provided defining a fluid channel having an inlet, an outlet, and a first depression intermediate the inlet and the outlet, wherein the first depression has a bottom surface surrounding the inlet and the outlet;
a valve seat upstanding from the bottom surface and surrounding at least one of the inlet and the outlet;
an elastically-deformable, spherical shell-shaped diaphragm that selectively closes the fluid channel by pressing against the seat and opens the fluid channel by separating from the seat, wherein the diaphragm has a circumferential edge portion;
a pressing adaptor that retains the circumferential edge portion of the diaphragm between the bottom surface of the first depression and itself, wherein the pressing adaptor has a tapered lower surface at a predetermined inclination angle with respect to the bottom surface; and
a diaphragm presser that selectively presses the diaphragm into sealing engagement with the valve seat,
wherein when the fluid channel is open, the diaphragm comes into wide surface contact with the tapered lower surface so that the diaphragm is hardly deformed and durability of the diaphragm is maximized based on selection of the predetermined inclination angle.

7. The diaphragm valve according to claim 1, wherein the predetermined inclination angle is approximatley 16°.

8. The diaphragm valve according to claim 1, wherein a curvature radius of a surface of the diaphragm presser that contacts the diaphragm is set between 10.5 mm to 12.5 mm.

9. The diaphragm valve according to claim 1, wherein the bottom surface of the first depression of the body forms a second circumferential depression and the outer circumferential edge portion of the diaphragm is contained inside the second circumferential depression.

10. The diaphragm valve according to claim 1, wherein the circumferential edge portion of the diaphragm is arc-shaped and does not have a flat portion.

* * * * *